United States Patent
Golka

(10) Patent No.: US 9,716,415 B2
(45) Date of Patent: Jul. 25, 2017

(54) CRANKSHAFT STARTER GENERATOR AND HOUSING FOR A CRANKSHAFT STARTER GENERATOR

(71) Applicant: MAN Truck & Bus AG, Munich (DE)

(72) Inventor: Markus Golka, Nuremberg (DE)

(73) Assignee: MAN TRUCK & BUS AG, Munich (DE)

( * ) Notice: Subject to any disclaimer, the term of this patent is extended or adjusted under 35 U.S.C. 154(b) by 273 days.

(21) Appl. No.: 14/527,089

(22) Filed: Oct. 29, 2014

(65) Prior Publication Data

US 2015/0130312 A1    May 14, 2015

(30) Foreign Application Priority Data

Nov. 8, 2013 (DE) .................. 10 2013 018 720

(51) Int. Cl.
| | | |
|---|---|---|
| H02K 5/04 | (2006.01) | |
| F02N 11/04 | (2006.01) | |
| H02K 1/14 | (2006.01) | |
| H02K 7/00 | (2006.01) | |
| H02K 7/14 | (2006.01) | |
| H02K 7/18 | (2006.01) | |

(52) U.S. Cl.
CPC ............... *H02K 5/04* (2013.01); *F02N 11/04* (2013.01); *H02K 1/148* (2013.01); *H02K 7/003* (2013.01); *H02K 7/14* (2013.01); *H02K 7/1815* (2013.01)

(58) Field of Classification Search
CPC .......... H02K 1/148; H02K 5/04; H02K 7/003; H02K 7/14; H02K 7/1815; F02N 11/04
USPC ....................................... 310/89, 102 R, 126
IPC ....................................... H02K 5/04; F02N 11/04
See application file for complete search history.

(56) References Cited

U.S. PATENT DOCUMENTS

| | | | |
|---|---|---|---|
| 9,133,809 B2* | 9/2015 | Vogel .................. | F02N 11/04 |
| 2002/0036434 A1* | 3/2002 | Tsuzuki ................ | B60K 6/40 |
| | | | 310/83 |
| 2002/0121817 A1* | 9/2002 | Weimer ................ | B60K 6/26 |
| | | | 310/54 |
| 2006/0192444 A1* | 8/2006 | Kim .................... | H02K 3/24 |
| | | | 310/54 |
| 2013/0264140 A1* | 10/2013 | Nakayama .......... | H02K 3/345 |
| | | | 180/443 |
| 2015/0130312 A1* | 5/2015 | Golka .................. | F02N 11/04 |
| | | | 310/89 |

* cited by examiner

*Primary Examiner* — John K Kim
(74) *Attorney, Agent, or Firm* — Lucas & Mercanti, LLP

(57) ABSTRACT

A housing for a crankshaft starter generator is designed so as to be divisible and/or a crankshaft starter generator without a housing and with a stator is designed so as to be divisible.

16 Claims, 7 Drawing Sheets

CRANKSHAFT STARTER GENERATOR AND HOUSING FOR A CRANKSHAFT STARTER GENERATOR

CROSS-REFERENCE TO RELATED APPLICATIONS

This application claims the priority of DE 10 2013 018 720.6 filed Nov. 8, 2013, which is incorporated herein by reference.

BACKGROUND OF THE INVENTION

The invention relates to a crankshaft starter generator and to a housing for a crankshaft starter generator (CSG).

In order to permit the first mixture formation, ignition and combustion in an internal combustion engine, internal combustion engines are brought to a predetermined minimum rotational speed by an external power source. For this purpose, various starters are known. In addition to ring gear starters, crankshaft starter generators are also known in the prior art. These are electric machines which sit on the crankshaft and have a starter and generator function and are generally referred to as crankshaft starter generators, because of the direct connection of the rotor thereof to the crankshaft of the internal combustion engine. The electric crankshaft starter generators have the advantage that the mechanical starter energy is transmitted without contact and therefore in a wear-free and quiet manner.

The crankshaft starter generators are arranged between the engine and transmission. The CSG rotor is connected to the flywheel, which is arranged on the transmission-side end of the crankshaft. Such rotor is thereby operatively connected to the crankshaft. The CSG stator is arranged in a positionally fixed manner on the inside of a housing accommodating the rotor, also referred to below as the CSG housing. The rotor or the rotor carrier is connected to a transmission of the output side via an adapter element, for example what is referred to as a flex plate. This connection typically takes place by screwing the adapter element to the transmission.

This arrangement has the disadvantage that the screwing points between transmission and adapter element, for example the flex plate, are not easily accessible in the event of transmission damage or another service situation, since said screwing points are concealed by the crankshaft starter generator, and the restricted construction space between engine and transmission makes accessibility for a tool difficult, especially in a service situation when the engine, the transmission and the crankshaft starter generator are still installed in the vehicle. When a crankshaft starter generator is provided between a transmission and the engine, it has previously therefore been necessary, in order to remove the transmission, first of all to remove the drivetrain arrangement consisting of engine flywheel, flywheel housing and crankshaft starter generator, in order to reach the screw connection between adapter element and transmission so as to be able to remove the transmission.

BRIEF SUMMARY OF THE INVENTION

It is therefore an object of the invention to provide a drivetrain arrangement with a crankshaft starter generator and a flywheel that avoids disadvantages of the drivetrain arrangements known from the prior art. It is in particular an object of the invention to provide a drivetrain arrangement which permits more rapid and easier removal of the transmission in a service situation and better accessibility for a tool.

The invention comprises the general technical teaching of designing a CSG housing and/or the stator of a crankshaft starter generator so as to be divisible. The CSG housing which can be arranged between a drive-side flywheel and output-side transmission comprises at least two housing parts which can be assembled releasably to form a CSG housing accommodating a starter generator. Furthermore preferably, the housing parts of the CSG housing form a closed ring in the assembled state.

According to a preferred embodiment, in a fitted state, in which the CSG housing accommodates a rotor of a starter generator, at least a part of the CSG housing can be removed. The accessibility for a tool can be increased by removal of said at least one housing part in the fitted state of the crankshaft starter generator on the transmission.

In a preferred exemplary embodiment, the CSG housing parts are formed in such a manner that at least one partial region of the teeth of the rotor is exposed by removing at least a part of the CSG housing. This can be realized, for example, by a housing section which accommodates a partial region of the teeth of the rotor being designed so as to be removable. By appropriate rotation of the position of the rotor, after removal of the housing part a screwing tool can then be introduced and can reach between the teeth of the rotor in order to release the screws with which an adapter means is screwed to the transmission. A particular advantage of the invention is therefore that the crankshaft starter generator and the flywheel do not need to be removed in a costly manner in terms of time via a rear-side opening in the flywheel housing in order to remove the transmission.

The housing parts of the CSG housing are advantageously formed in such a manner that said housing parts, in the assembled state, form a closed ring in order to permit as compact a structural form as possible.

According to a preferred exemplary embodiment, the CSG housing can be divided into parts of equal size. For example, in one possible realization according to the invention, the CSG housing can be assembled from two housing halves of equal size, for example from two housing parts which are in the shape of half-cylinder jackets and can be assembled to form a hollow-cylindrical housing. According to another variant, the housing can be assemblable from four housing quarters.

However, in other embodiments it is also possible to design the CSG housing in such a manner that said housing can be divided into two or more parts of unequal size, i.e., can be composed of two or more parts of unequal size. In this case, the size of at least one part can be a multiple of the size of another part. However, this is not absolutely necessary, and any division of the size of the parts may also be selected.

According to a further preferred embodiment of the invention, the stator of the crankshaft starter generator, which is accommodated by the CSG housing, is likewise designed so as to be divisible and is arranged in a positionally fixed manner on the inside of the housing. This has the advantage that not only a housing part, but also a stator part can be removed in the fitted state in order thereby to increase the accessibility to fastening means which are arranged in the interior of the CSG housing. The stator can therefore advantageously also be designed as part of the CSG housing.

In an advantageous variant of this embodiment, the divisible design of the stator is matched to the divisible design of the CSG housing in such a manner that each stator part is arranged on the inside of at most one housing part of the CSG housing. One advantage of this variant is therefore that, by removal of a corresponding housing part, a corresponding stator part can simultaneously be removed in one step in order thereby rapidly to expose a suitable tool access. A stator which is composed of a plurality of individual parts has the further advantage that, by means of the segmentation of the stator laminates, the scrap which customarily arises during the manufacturing of the sheet-metal rings for a continuous stator is considerably reduced.

It is furthermore advantageous if each stator part of a stator which is designed so as to be divisible has a dedicated power line leadthrough to a central control unit. This permits synchronization and coordination of the individual stator parts via the central control unit. According to a further aspect, the power line leadthrough or the power line leadthroughs of the stator can be arranged at an intersection of two CSG housing parts. In an advantageous variant of this embodiment, grooves, into which the power line leadthrough cables emerging from the stator are placed and are surrounded and fixed in a watertight and dirttight manner by the CSG housing, are introduced at the intersection of two adjacent CSG housing parts. This dispenses with the necessity of providing an additional cable housing which is additionally attached by cable screw connections to the CSG housing, in the case of conventional crankshaft starter generators, in order to lead out the cables emerging from the stator.

In a further possible realization, according to the invention, the CSG housing can comprise open and/or closed cooling ducts in order to transport away the heat arising from the stator. In this connection, the cooling ducts are preferably arranged in the individual CSG housing parts in such a manner that the cooling ducts of adjacent housing parts are fluidically connected such that fluid can pass from one housing part into the next. In an advantageous variant of this embodiment, a cooling duct wall, in particular that of an open cooling duct, can be at least partially formed by the stator in order to achieve an direct and effective cooling action. The stator here may optionally be provided with a coating in order to avoid the formation of rust. This is particularly advantageous in the situation in which the stator is not accommodated by a housing, which is explained in more detail below.

In a further embodiment of the invention, a tube element is introduced at a first end region into a cooling duct of a CSG housing part and is introduced by a second, opposite end region into a cooling duct of an adjacent CSG housing part. A tube element of this type advantageously fulfils a dual function: Firstly, the tube element ensures a secure passage of fluid from one housing part into the adjacent housing part; secondly, the tube element can be used at the same time for positioning adjacent housing parts with respect to one another when the latter are reassembled after having been removed.

The tube element is preferably provided with a bevel at one and/or both of the end regions thereof in order to permit a fluid introduction of the tube element and/or the housing parts to be assembled without tilting. In addition or alternatively, the end region can also have a tapered, for example conical, design. Furthermore preferably, one or both end regions can be provided with a fit. Alternatively or in addition, according to a further variant, a seal, for example an O-ring, can be respectively provided at the two end regions of the tube element. These measures ensure that the cooling ducts of adjacent housing parts can be coupled fluidically as tightly as possible.

According to a further preferred exemplary embodiment, a sealing element is arranged between the CSG housing and the stator. According to a variant of this embodiment, the above mentioned cooling ducts are incorporated into the sealing element. It is likewise advantageous to integrate the power line leadthrough on the CSG housing into the sealing element at an intersection of the CSG housing parts.

According to a further aspect, the CSG housing is designed in such a manner that said housing can be at least partially integrated into the flywheel housing.

In order to connect the stator parts and the housing parts of the CSG housing, which is designed so to be divisible, and the stator, which is designed to be divisible, in a precise and secure manner to one another, the stator, according to a further variant, can have at least one form-fitting element which is in engagement with at least one corresponding recess of a CSG housing part. The form-fitting element can be designed, for example, as a projection, lug or rib which protrudes on the outer surface of the stator in the direction of the CSG housing part. The form-fitting element serves at the same time for positioning and as a means of securing against rotation.

Alternatively, the stator can have at least one receptacle which can be brought into a form-fitting connection with at least one form-fitting element of the CSG housing, which form-fitting element protrudes on the outer surface of the CSG housing in the direction of the stator. In addition to the form-fitting connection, the stator, additionally or alternatively, can be connected frictionally to the CSG housing. The stator part is advantageously screwed to the corresponding housing part on the form-fitting element.

According to a further advantageous embodiment, the stator is designed in such a manner that an outer partial surface of the stator projects out of the CSG housing in the axial direction on the drive side. If the width of the stator is therefore greater than that of the housing and, in the fitted state, projects in the direction of a flywheel housing, said outer projecting partial surface can be used as a centring means and positioning element with respect to the flywheel housing. In this connection, the flywheel housing is advantageously designed in such a manner that said flywheel housing has a corresponding receptacle or fit, into which the projecting stator surface can be inserted and centred. This permits a rapid and precisely positioned installation of the crankshaft starter generator on the flywheel.

A further aspect of the invention relates to a crankshaft starter generator, comprising a CSG housing according to one of the above-described aspects. In addition to the CSG housing, the crankshaft starter generator comprises a stator which, as described above, can advantageously also be designed as part of the CSG housing. Furthermore, the crankshaft starter generator comprises a rotor, comprising the rotor teeth and a rotor carrier for receiving the rotor teeth and for coupling the rotor to the flywheel.

According to a further aspect, the technical problem of making possible a drivetrain arrangement which permits more rapid and easier removal of the transmission in a service situation and better accessibility for a tool can also be achieved in that a crankshaft starter generator is provided without a housing, but with a stator which is designed so as to be divisible. In other words, a crankshaft starter generator without a housing is proposed, the crankshaft starter generator comprising a stator which is designed so as to be divisible and which at the same time forms an outer interface, i.e. outer surface, of the crankshaft starter generator. In other words, the divisible stator is not accommodated by a CSG housing, but rather itself forms the outer surface of the crankshaft starter generator at least in the radial direction, i.e. perpendicularly to the axial direction of the crankshaft. In the fitted state, the stator which is designed so as to be divisible preferably forms a closed ring around the rotor.

In the fitted state, in which the stator accommodates the rotor of a starter generator, at least a part of the stator can be removed. By removal of said at least one stator part or stator core on the transmission, the accessibility of the crankshaft starter generator for a tool in a service situation can be increased.

In this connection, the stator can have the previously described features, such as, for example, a divisibility of the stator into parts of equal size, for example into two halves or into four quarters, the separate power line leadthroughs, etc., with the exception that the stator in this variant is not arranged on the inside of a CSG housing. In order to avoid repetitions, reference is made in this respect to the previous description.

The stator preferably comprises an outer protective coating which protects the stator and the crankshaft starter generator against damage. For this purpose, use may be made of protective coatings which are known from the prior art.

A further aspect of the invention relates to a vehicle, in particular to a commercial vehicle, comprising a starter generator or a starter generator housing according to one of the above-described aspects.

Further details and advantages of the invention are described below with reference to the attached drawings, in which:

DETAILED DESCRIPTION OF THE PREFERRED EMBODIMENT

Figure 1:
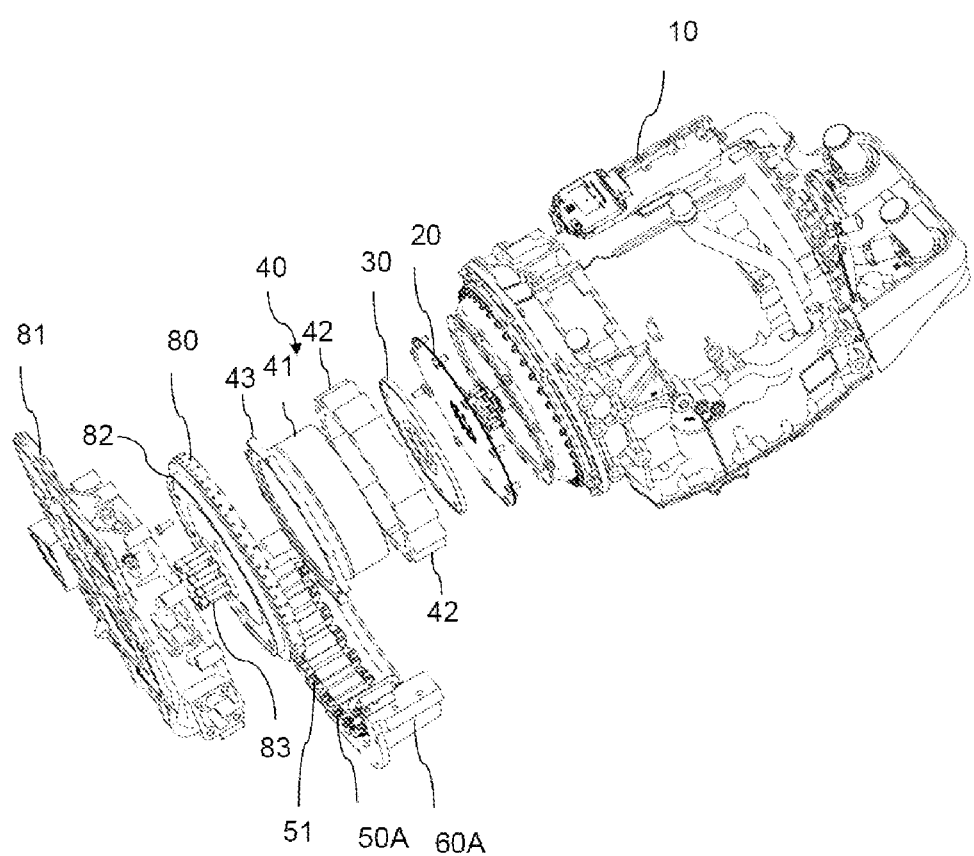
FIG. 1 shows an exploded illustration of a drivetrain arrangement according to an exemplary embodiment of the present invention.

FIG. 1 shows a drivetrain module with a CSG housing according to an exemplary embodiment. For illustration reasons, only one housing half 60A of the CSG housing is shown in FIG. 1.

The drivetrain module comprises a flywheel 80 which is operatively connected to the crankshaft (not shown) and is held in a flywheel housing 81. The flywheel 80 is fastened to the crankshaft by means of cheese head screws 83. The flywheel 80 furthermore comprises a supporting surface 82 for a ring gear (not shown).

The crankshaft starter generator comprises a CSG housing which is designed so as to be divisible and is formed from two semicircular, structurally identical housing parts 60A, 60B, with only one of the housing halves 60A being shown in FIG. 1.

The crankshaft starter generator furthermore comprises a stator which is likewise designed so as to be divisible and is composed of two structurally identical stator cores 50A and 50B, with likewise only one of the stator cores 50A being in shown in FIG. 1. The stator core is formed from intermeshing electric sheets which are welded to one another, and from the stator windings which are accommodated therein. The stator half 50A is arranged in a positionally fixed manner on the inner circumference of the associated CSG housing half 60A. The stator is therefore designed in such a manner that it is matched to the divisible design of the CSG housing. In the present exemplary embodiment, each stator half 50A or 50B is therefore assigned to a housing half 60A or 60B and matched to the dimensions thereof in order to be able to be arranged on the inside of the associated housing part 60A or 60B of the CSG housing.

Although the housing parts 60A, 60B and stator parts 50A, 50B, are indicated as separate elements, the CSG may alternatively be arranged with only a stator, i.e., without a separate housing. In this case, the stator would provide both the function of the housing 60A, 60B and the stator 50A, 50B.

The crankshaft starter generator furthermore comprises a rotor 40, with a rotor carrier 41 on which the rotor teeth 42 are fastened on the circumferential side. The drive-side end region of the rotor carrier 41 has a flange surface 43 with a thread, via which the rotor carrier 41 can be fastened to the flywheel 80 for rotation therewith.

The crankshaft starter generator is fastened to a transmission, for example an automatic transmission 10, via an adapter arrangement 20, 30. In this connection, a "flex plate" 20 is screwed to the transmission 10.

Figure 2:
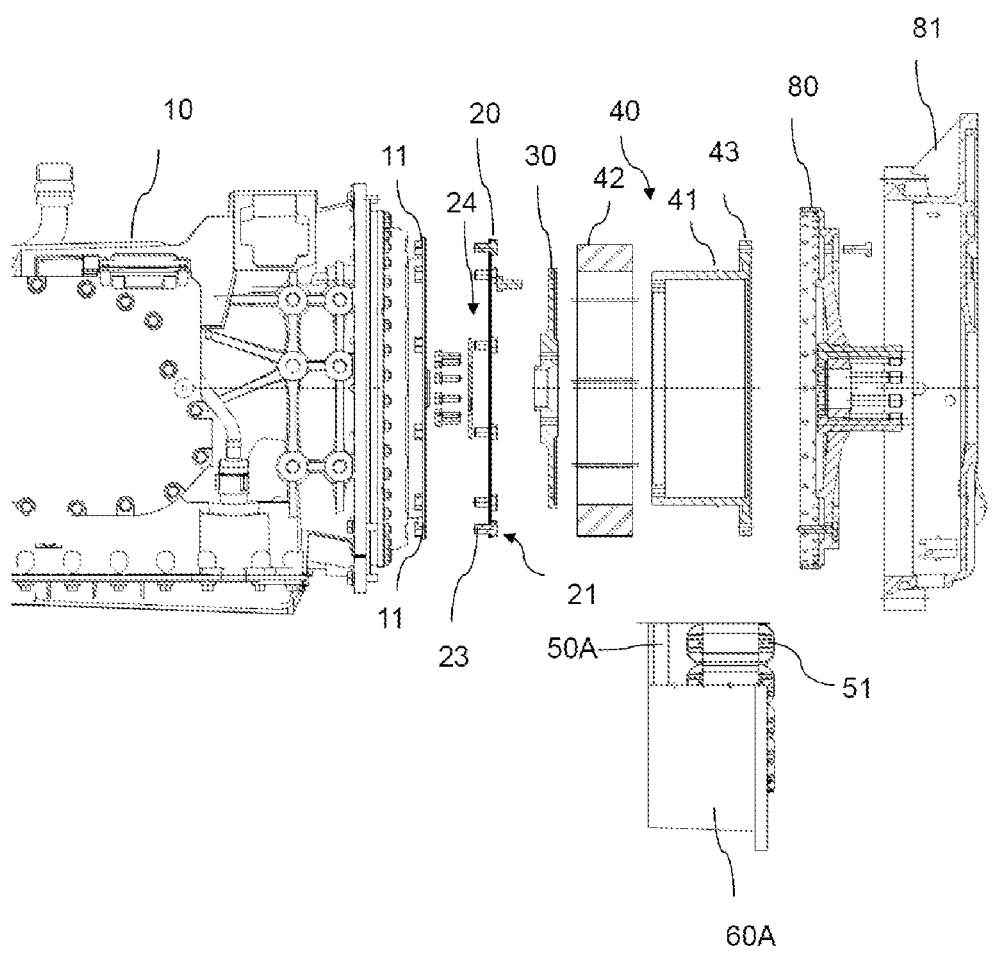
FIG. 2 shows a perspective exploded illustration of the drivetrain arrangement of FIG. 1 in a side view.

As is apparent in FIG. 2, the flex plate 20 is screwed onto the end side of the transmission 10 by a plurality of screw bolts 23. For this purpose, the flex plate 20 has a plurality of axially running passage openings in a radially outer region. A plurality of nuts 11 are assigned to the passage openings on the transmission housing, said nuts being arranged distributed in the circumferential direction and being welded to the housing and forming the counter carry-along arrangement. Furthermore, further passage bores for the screw connection of the flex plate are located on the inner pitch circle diameter 24 of the flex plate.

Flex plates 20 of this type are known from the prior art and can firstly transmit a torque from the drive side to the input side of the transmission and secondly can absorb axial displacements of the drive-side components in such a manner that said displacements are not transmitted to the input side of the torque converter. An adapter plate 30 is provided as a further connecting element between the crankshaft starter generator or the rotor carrier 41 and the flex plate 20, and therefore the crankshaft starter generator can be matched to the flex plate 20 which is provided for the transmission 10. However, it is emphasized that, instead of the flex plate, it is also possible, for example, to use a rigid, disc-shaped plate, or other adapter elements, for example plate-like adapter elements, in order to provide an adapter arrangement between the crankshaft starter generator and the transmission 10.

With the exception of the crankshaft starter generator, the components, shown here, of the drivetrain arrangement shown in FIGS. 1 and 2 are known per se from the prior art and do not need to be described in more detail here.

Figure 3:
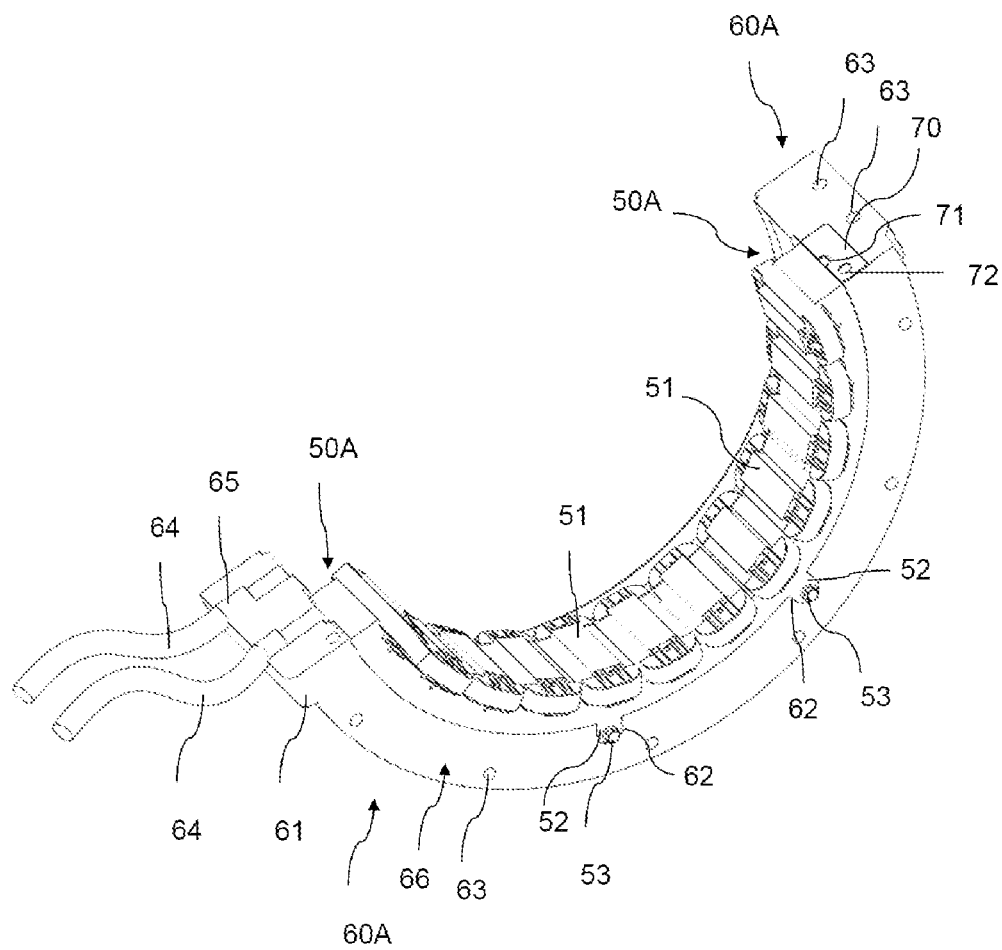
FIG. 3 shows a CSG housing part according to an exemplary embodiment of the present invention.

Part of an exemplary embodiment of a CSG housing is shown in an enlarged view in FIG. 3. According to the exemplary embodiment shown, the CSG housing comprises two housing halves 60A and 60B which are of substantially structurally identical design and of which, in turn, only one housing half 60A is shown in FIG. 3. The CSG housing halves are connected to each other at the flange surfaces 61. The flange surfaces have passage bores 63. The two parts 60A, 60B preferably form a closed ring which is formed as point-symmetrically as possible so that the operation and the lines of electric flux which occur through the rotor and the stator have as homogeneous a profile as possible over the rotational movement.

The CSG housing half 60A is of semicircular design and has a stator part 50A matched to the dimensions of the CSG housing half 60A. A CSG housing within the context of this invention can also comprise the stator of the crankshaft starter generator.

The stator core 50A is arranged in a positionally fixed manner on the inside of the corresponding housing part 60A. For this purpose, the outer surface of the stator half 50A has a plurality of projections 52, which project radially in the direction of the CSG housing half 60A, as form-fitting elements. At the associated points, the CSG housing half has correspondingly designed recesses 62 in order to form a form-fitting connection between stator element 50A and housing part 60A. In addition, the form-fitting element 52 is screwed frictionally to the housing part 60A via screws 53. The stator windings 51 are arranged on the inner circumference of the stator part 50A. According to a further variant, the stator can be cast therearound.

Each stator part 50A, 50B has a dedicated power line leadthrough or cable connection 64 to a central control unit (not shown). The power line leadthrough 64 of the stator is arranged at an intersection 61 of two adjacent housing parts 60A, 60B. In this connection, grooves 65, into which the cables of the power line leadthrough 64 that emerge from the stator are placed and, in the assembled state of the CSG housing, are surrounded and fixed in a watertight and dirttight manner by the CSG housing, are provided at the intersection 61. This eliminates the need for an additional cable housing.

Furthermore, the CSG housing has open cooling ducts 71 or closed cooling ducts 72 for transporting away the heat arising from the stator 50A, 50B, wherein the cooling ducts 71, 72 are arranged in the individual CSG housing halves 60A, 60B in such a manner that the cooling ducts 71, 72 of adjacent housing parts are fluidically connected. As is furthermore apparent in FIG. 3, a cooling duct wall of the open cooling duct 71 is at least partially formed by the stator 50A. Passage bores 63 which are spaced apart from one another are provided on the lateral flange surface 66 of the CSG housing half 60A, 60B with respect to the flywheel housing 81 in order to be able to screw the CSG housing to the flywheel housing.

Figure 4:
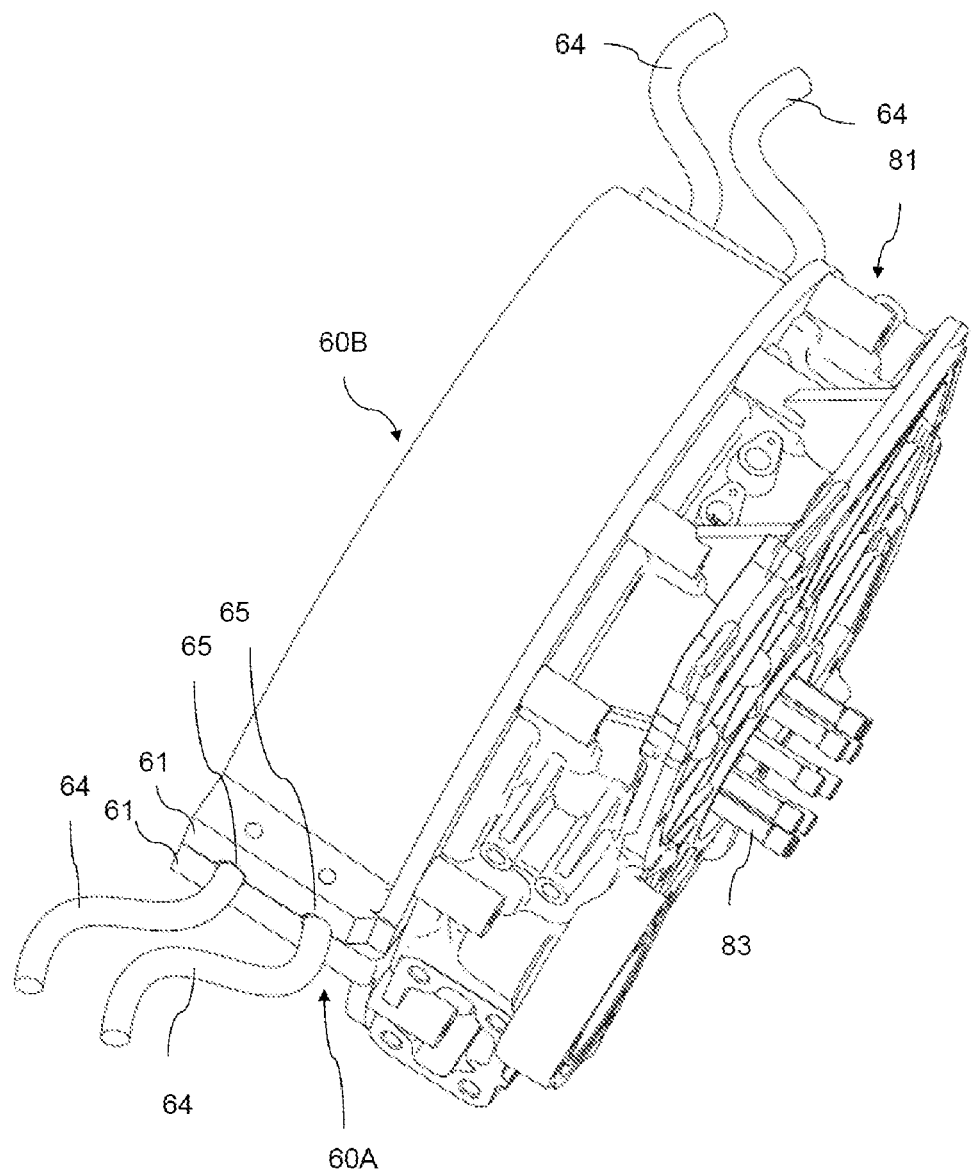
FIG. 4 shows a CSG housing in the assembled state and fitted on a flywheel housing according to an exemplary embodiment of the present invention.

FIG. 4 shows the two CSG housing halves 60A and 60B in the assembled state, and in a state in which the CSG housing 60A, 60B is screwed to the flywheel housing 81. FIG. 4 furthermore illustrates how the flange surfaces 61 which are arranged at the intersection of the two housing halves surround the emerging stator cables 64 by means of the grooves 65 incorporated in said flange surfaces.

Figure 5A:
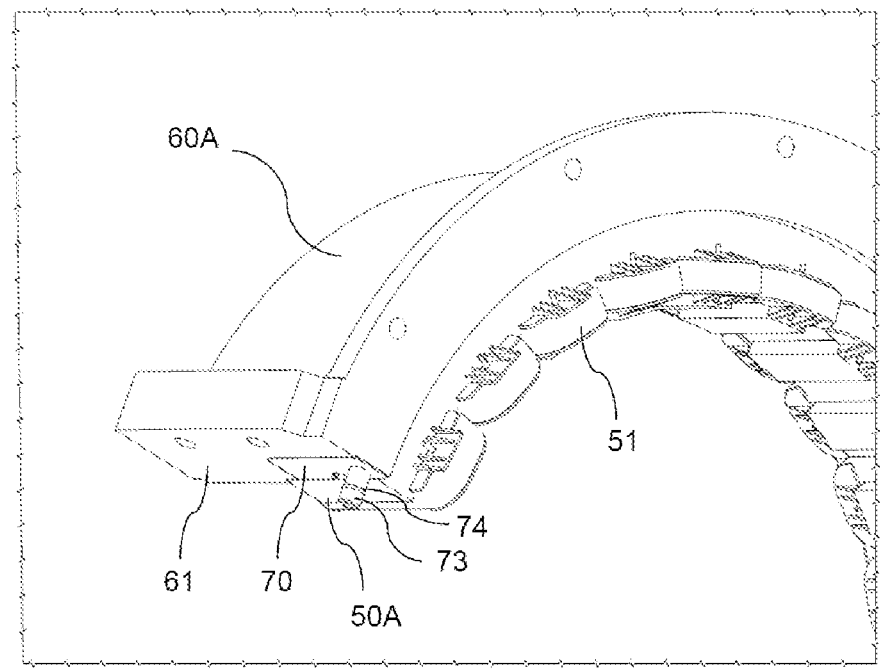
FIG. 5A shows a CSG housing part according to an exemplary embodiment of the present invention.
Figure 5B:
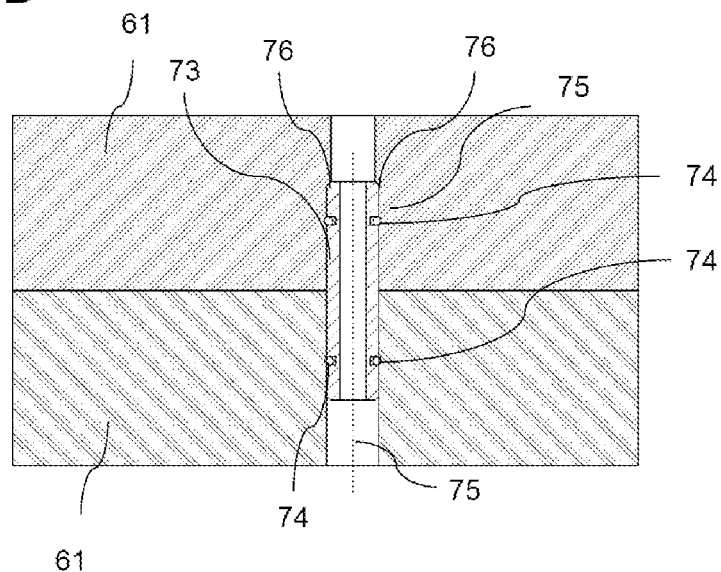
FIG. 5B shows two adjacent sealing elements and a tube element of a CSG housing according to an embodiment of the present invention.

FIGS. 5A and 5B show a further advantageous variant embodiment of the CSG housing. The cooling ducts 71, 72 via which heat arising from the stator can be transported away are incorporated into the sealing element 70. The cooling ducts 71, 72 are arranged in the individual CSG housing parts in such a manner that the cooling ducts of adjacent housing parts 60A, 60B are coupled fluidically to each other in the assembled state.

In order to connect the cooling ducts of adjacent housing parts to one another, a tube element 73 is provided, said tube element being inserted into a cooling duct 72 at a first end region of the sealing element 70 of the CSG housing part and being able to be inserted by a second, opposite end region into the corresponding cooling duct 72 in the sealing element 70 of the adjacent CSG housing part. For this purpose, the tube element 73 has sealing rings 74 at each of the two end regions, the sealing rings preventing fluid from being able to emerge at the intersection 61. When the tube element 73 is used, fluid can pass in a sealed manner between adjacent housing halves even without a sealing element 70, which can be omitted.

As FIG. 5B furthermore shows, a bevel 76 in the form of a bevelled surface on the outer tube edge is provided in the end regions of the tube element 73. In addition, the tube element 73 is provided with a fit in the upper and lower end regions. This means that the diameter is manufactured more precisely there than previously so that the position of the two CSG housing halves with respect to each other can be determined more precisely. The sealing tube element 73 therefore serves at the same time for positioning the two housing halves (only the two flange surfaces 61 of the upper and lower housing halves are shown in FIG. 5B).

The divisibility of the CSG housing makes possible both simpler installation and simpler removal of the transmission arrangement, and this will be explained in more detail below with reference to FIGS. 6 and 7.

Figure 6:
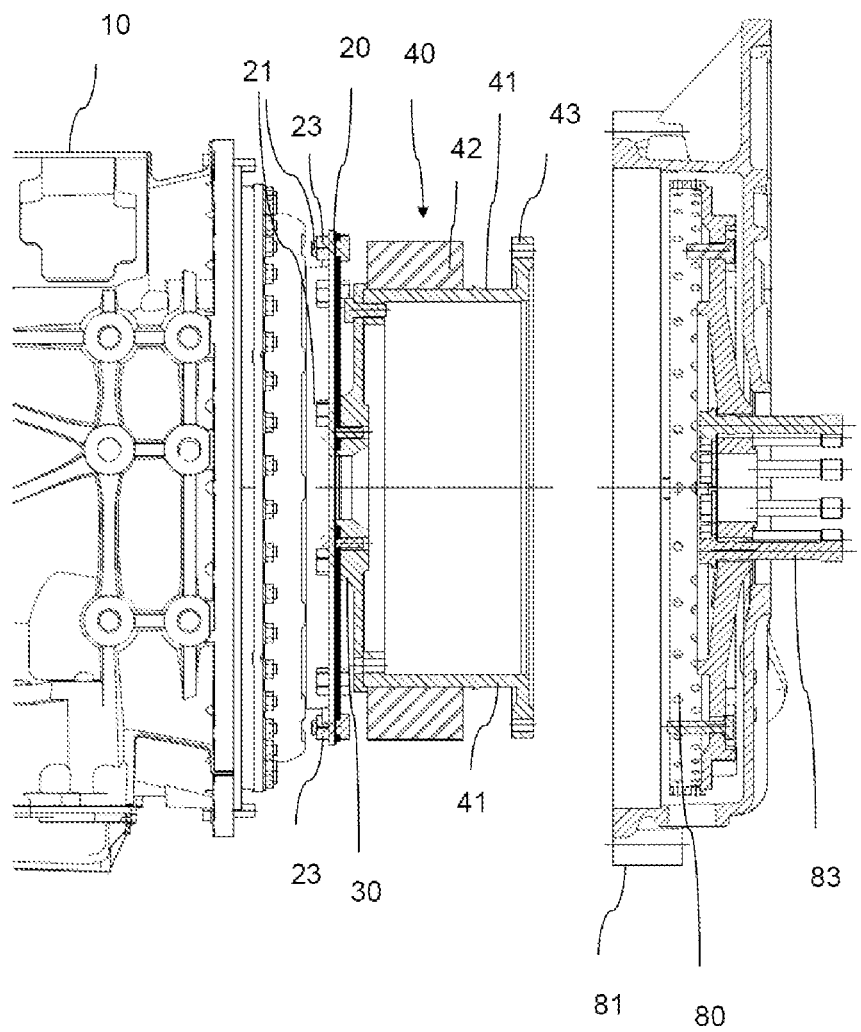
FIG. 6 shows a drivetrain module in a preassembled state.

FIG. 6 shows a partially assembled state of the transmission arrangement. During the preassembly, the divided stator core 50A, 50B is connected to the divided CSG housing 60A, 60B, for example by a screw connection, pressing, a form-fitting connection, by the stator core being cast around, etc., and is present as a separate assembly. Subsequently, during the installation operation, first of all the rotor 40 with the rotor carrier 41 and the rotor toothed ring 42, which is fastened to the latter, is merely screwed to the flex plate 20 via the adapter plate 30.

The flex plate 20 is connected on the flywheel side via an adapter to the inner pitch circle diameter. The flex plate 20 is screwed via the outer pitch circle diameter 21 thereof on the transmission side to the transmission 10. After all of the screws have been tightened—for this purpose, a temporary rotation of the flex plate and flywheel connection is necessary—the housing with the stator core is placed on and closed.

Since, during this installation operation, the divisibility of the housing makes it possible for the housing parts 60A, 60B and the stator parts 50A, 50B to be able to be fitted only at a later point, the accessibility to the axial screw connection on the outer pitch circle diameter 21 with a screwing tool is improved. After all of the screws 23 on the outer pitch circle diameter 21 have been tightened—for this purpose, a partial rotation of the flex plate on the adapter flywheel connection is necessary—the outstanding CSG housing assembly is fitted and connected to form a closed housing ring (not shown). The CSG housing segments 60A, 60B surround the rotor 40 and are connected to each other via the flange surfaces 61.

Figure 7:
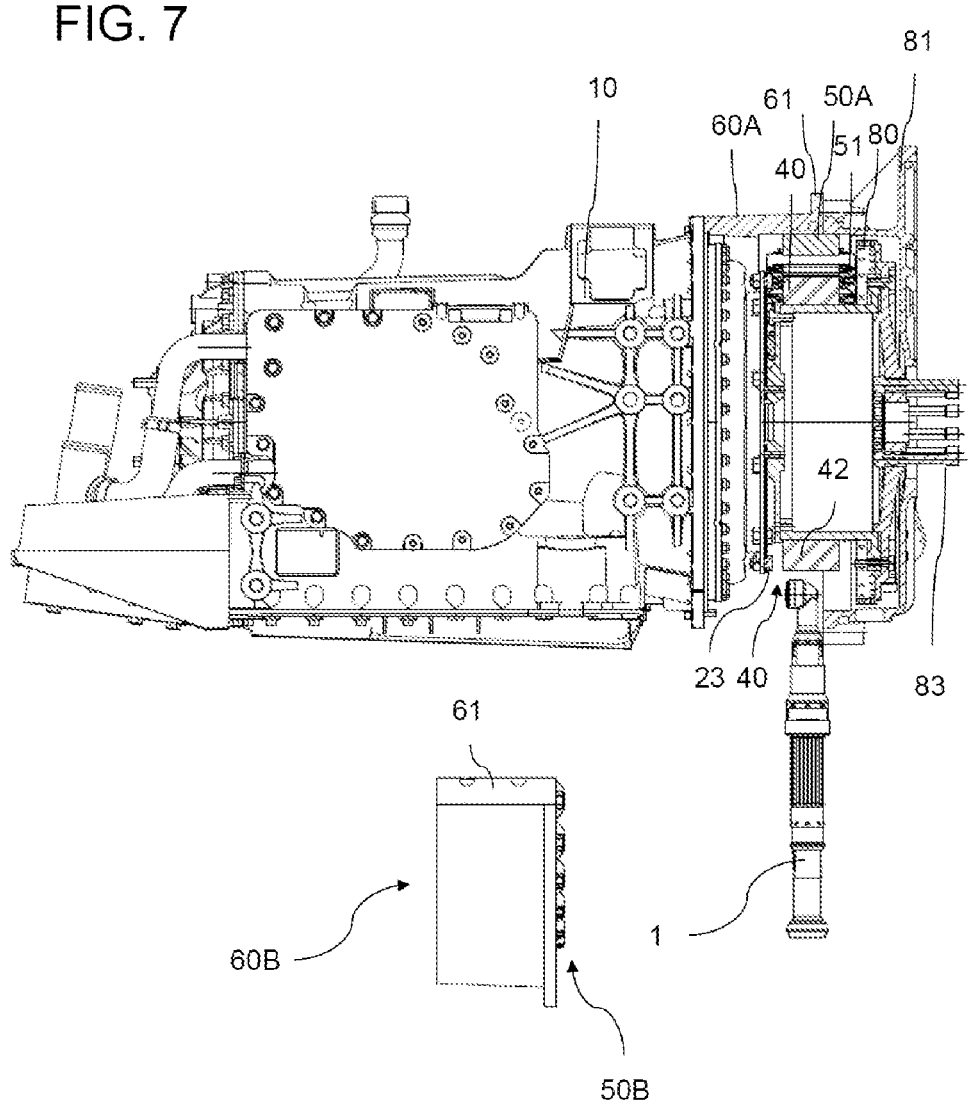
FIG. 7 shows a drivetrain module with removed CSG housing part according to an exemplary embodiment of the present invention.

FIG. 7 illustrates the advantage of the invention in a service situation, for example in the event of transmission damage, where the transmission has to be exchanged. In order to ensure the handling of the screws, in particular the screw connection of the outer flex plate screws 23 to the transmission 10, in a first step at least one of the housing parts 60B is removed from the fitted drivetrain arrangement by release of the screw connection at the flange surfaces 61. This permits accessibility to the flex plate and transmission screw connection on the outer pitch circle diameter 21 of the flex plate. FIG. 7 shows that one housing half 60B is removed while the other housing half 60A still half accommodates the rotor 40. By removing the housing half 60B, a screwing tool 1, optionally by rotation of the rotor 40, can engage in the intermediate space between the teeth 42 and can thus reach the screws 23 on the outer pitch circle diameter 21 of the flex plate 20. As a result, the transmission 20 can be removed with the rotor 40 and flywheel 80 fitted, and a laborious removal via a rear-side opening in the flywheel housing 81 can be dispensed with. Depending on the configuration of the width of the stator, because of the restricted individual construction space the flywheel housing 81 can optionally additionally be divided in order further to improve the accessibility.

Although the invention has been described with reference to certain exemplary embodiments, a multiplicity of variants and modifications which likewise make use of the inventive concept and therefore fall within the scope of protection is possible. In particular, the divisibility of the housing and of the stator can differ from the described variant embodiments and can be matched to the available construction space in the specific drivetrain in order to ensure optimum accessibility for a tool. Furthermore, the CSG housing according to the invention can be used in a multiplicity of structurally different drivetrains. Consequently, the invention is not intended to be limited to the specific exemplary embodiments disclosed, but rather the invention is intended to comprise all exemplary embodiments which fall within the scope of the attached patent claims.

LIST OF REFERENCE NUMBERS

1 screwing tool
10 transmission
11 nut
20 flex plate
21 outer pitch circle diameter
22 hole
23 screw
24 inner pitch circle diameter
30 adapter
40 rotor
41 rotor carrier
42 rotor teeth
43 web
50A, 50B stator parts
51 stator windings
52 form-fitting element
53 screw
60A, 60B CSG housing half
61 flange surface
62 recess
63 passage bore
64 cable connection
65 groove
66 flange surface
70 sealing element
71 open cooling duct
72 closed cooling duct
73 tube element
74 seal
75 fit
76 bevel
80 flywheel
81 flywheel housing
82 receptacle
83 fixing pins

The invention claimed is:

1. A crankshaft starter generator (CSG) housing divided circumferentially into at least two housing parts, the CSG housing is designed to be arranged between an engine and a transmission, and the CSG housing is designed to be divisible so that in a connected state, in which the CSG housing is connected to the engine and the transmission, one of the at least two housing parts is removable while others of the at least two housing parts remain connected to the engine and the transmission.

2. The crankshaft starter generator housing according to claim 1, wherein in a fitted state, in which the CSG housing accommodates a rotor of a starter generator, the one of the at least two housing parts is removable to expose a partial region of teeth of the rotor.

3. The crankshaft starter generator housing according to claim 1, wherein the at least two housing parts are of equal size.

4. The crankshaft starter generator housing according to claim 1, wherein the at least two housing parts include one of two housing halves and four housing quarters.

5. The crankshaft starter generator housing according to claim 1, further comprising a stator arranged in a positionally fixed manner on the inside of the housing, the stator having at least two stator parts.

6. The crankshaft starter generator housing according to claim 5, wherein the at least two stator parts correspond to the at least two housing parts of the CSG housing such that each of the at least two stator parts is arranged on a radial inner of a corresponding one of the at least two housing parts.

7. The crankshaft starter generator housing according to claim 5, wherein each of the at least two stator parts has a dedicated power line leadthrough to a central control unit.

8. The crankshaft starter generator housing according to claim 5, wherein a power line leadthrough of the starter is arranged at an intersection of two of the at least two housing parts of the CSG housing.

9. The crankshaft starter generator housing according to claim 5, further comprising grooves into which power line leadthrough cables emerging from the stator are placed, the grooves being surrounded and fixed in a watertight and dirttight manner by the CSG housing, the grooves being introduced at an intersection of two adjacent ones of the at least two housing parts of the CSG housing.

10. The crankshaft starter generator housing according to claim 1, wherein the CSG housing comprises at least one of open cooling ducts and closed cooling ducts for transporting away the heat arising from the stator, wherein the cooling ducts are arranged in individual one of the at least two housing parts such that the cooling ducts of adjacent ones of the at least two housing parts fluidically connected.

11. The crankshaft starter generator housing according to claim 5, wherein a cooling duct wall is at least partially formed by the stator, wherein the corresponding point of the stator is preferably coated with a rust prevention coating.

12. The crankshaft starter generator housing according to claim 10, further comprising a tube element introduced at a first end region into a cooling duct of one of the at least two housing parts and introduced by a second, opposite end region into a cooling duct of an adjacent one of the at least two housing parts.

13. The crankshaft starter generator housing according to claim 12, wherein the tube element is provided with at least one of a bevel, a conical design, a fit and a seal at least one of the end regions.

14. The crankshaft starter generator housing according to claim 5, further comprising a sealing element arranged between the CSG housing and the stator.

15. The crankshaft starter generator housing according to claim 14, wherein at least one of cooling ducts and power line leadthroughs are incorporated into the sealing element.

16. The crankshaft starter generator housing according to claim 5, wherein the stator comprises an element that one of engages with a corresponding recess of one of the at least two housing parts and projects out of the CSG housing.

* * * * *